US010502503B2

(12) United States Patent
Kurochkin et al.

(10) Patent No.: US 10,502,503 B2
(45) Date of Patent: Dec. 10, 2019

(54) HEAT EXCHANGER ASSEMBLY

(71) Applicant: Hamilton Sundstrand Corporation, Charlotte, NC (US)

(72) Inventors: Alexander N. Kurochkin, Moscow (RU); Anthony DeLugan, Agawam, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 164 days.

(21) Appl. No.: 15/684,204

(22) Filed: Aug. 23, 2017

(65) Prior Publication Data

US 2019/0063851 A1 Feb. 28, 2019

(51) Int. Cl.
| F28F 9/02 | (2006.01) |
| F28F 9/00 | (2006.01) |
| F28D 21/00 | (2006.01) |
| B64D 13/06 | (2006.01) |

(52) U.S. Cl.
CPC ............... *F28F 9/02* (2013.01); *F28F 9/001* (2013.01); *B64D 13/06* (2013.01); *B64D 2013/0688* (2013.01); *F28D 2021/0021* (2013.01)

(58) Field of Classification Search
CPC ...... F28F 9/02; F28F 9/001; F28F 2009/0285; F28D 2021/0021; F28D 1/0417; F28D 1/0443; F28D 7/1615; B64D 13/06; B64D 13/08; B64D 2013/0688
See application file for complete search history.

(56) References Cited

U.S. PATENT DOCUMENTS

| 5,904,206 A | 5/1999 | Kroetsch |
| 6,155,339 A | 12/2000 | Grapengater |
| 8,601,826 B2 * | 12/2013 | Army ................... B64D 13/00 62/93 |
| 8,978,746 B2 | 3/2015 | Cornell et al. |
| 9,302,778 B2 * | 4/2016 | Ji ............................ F02C 7/25 |
| 9,470,461 B2 | 10/2016 | Merklein et al. |
| 10,107,554 B2 * | 10/2018 | DeLugan ............. F28F 9/0214 |
| 2009/0139702 A1 | 6/2009 | Hogan |
| 2010/0186397 A1 * | 7/2010 | Emrich ................. F02M 26/11 60/320 |

(Continued)

FOREIGN PATENT DOCUMENTS

| EP | 2835312 A1 | 2/2015 |
| JP | 3209760 B2 * | 9/2001 ............. F01N 5/02 |

OTHER PUBLICATIONS

Extended European Search Report for International Application No. 18189725.7 dated Jan. 24, 2019, 7 pages.

*Primary Examiner* — Devon Russell
(74) *Attorney, Agent, or Firm* — Cantor Colburn LLP

(57) ABSTRACT

A heat exchanger assembly includes an outlet header having a first side panel, a second side panel, and a front panel. The first side panel has a first side panel first portion, a first side panel second portion, and a first side panel arcuate portion. The second side panel has a second side panel first portion, a second side panel second portion, and a second side panel arcuate portion. The front panel extends between the first side panel first end and the second side panel first end. The front panel includes a front panel first end that abuts the first side panel first end and a front panel second end that abuts the second side panel first end.

12 Claims, 2 Drawing Sheets

(56) References Cited

U.S. PATENT DOCUMENTS

| | | | |
|---|---|---|---|
| 2012/0255715 A1* | 10/2012 | Army | B64D 13/06 |
| | | | 165/148 |
| 2013/0056188 A1 | 3/2013 | Gard et al. | |
| 2013/0068421 A1* | 3/2013 | Army | F28F 11/00 |
| | | | 165/70 |
| 2014/0060052 A1* | 3/2014 | Kurihara | F28F 9/0202 |
| | | | 60/670 |
| 2014/0231054 A1* | 8/2014 | Martins | F02B 29/0462 |
| | | | 165/166 |
| 2017/0146303 A1* | 5/2017 | Mayo | F28D 9/0043 |

* cited by examiner

HEAT EXCHANGER ASSEMBLY

BACKGROUND

Exemplary embodiments pertain to the art of heat exchanger assemblies.

An aircraft cabin may receive a flow of conditioned air from an environmental control system. The environmental control system includes a heat exchanger that conditions air that is to be provided to the aircraft cabin. Transient operating conditions of the aircraft may induce thermal stresses in various sections of the heat exchanger. Accordingly, it is desirable to provide a more robust heat exchanger for an aircraft environmental control system.

BRIEF DESCRIPTION

Disclosed is a heat exchanger assembly for an environmental control system. The heat exchanger assembly includes an inlet header, a primary heat exchanger, and an outlet header. The inlet header is arranged to receive a first fluid that flows along a first axis. The primary heat exchanger is arranged to receive a second fluid that flows along a second axis that is disposed transverse to the first axis. The primary heat exchanger is arranged such that the first fluid flows through the primary heat exchanger along the first axis. The outlet header is operatively connected to the primary heat exchanger and arranged to exhaust the first fluid. The outlet header includes a first side panel and a second side panel. The first side panel has a first side panel first portion, a first side panel second portion, and a first side panel arcuate portion extending between the first side panel first portion and the first side panel second portion along the first axis. The second side panel is spaced apart from the first side panel. The second side panel has a second side panel first portion, a second side panel second portion, and a second side panel arcuate portion extending between the second side panel first portion and the second side panel second portion.

In addition to one or more of the features described herein, a first width is measured between the first side panel first portion and the second side panel first portion, a second width is measured between the first side panel second portion and the second side panel second portion, and a third width is measured between the first side panel arcuate portion and the second side panel arcuate portion.

In addition to one or more of the features described herein, the third width is greater than at least one of the first width and the second width.

In addition to one or more of the features described herein, the first side panel first portion, the first side panel second portion, and the first side panel arcuate portion extends from a first side panel first end towards a first side panel second end along the second axis.

In addition to one or more of the features described herein, the first side panel first portion and the first side panel second portion are disposed parallel to the first axis and the first side panel arcuate portion is disposed in a nonparallel relationship with the first axis.

In addition to one or more of the features described herein, the second side panel first portion, the second side panel second portion, and the second side panel arcuate portion extends from a second side panel first end towards a second side panel second end along the second axis.

In addition to one or more of the features described herein, the second side panel first portion and the first side panel second portion are disposed parallel to the first axis and the second side panel arcuate portion is disposed in a nonparallel relationship with the first axis.

In addition to one or more of the features described herein, a front panel extending between a front panel first end and a front panel second end, wherein the front panel first end is connected to the first side panel first end and the front panel second end is connected to the second side panel first end.

In addition to one or more of the features described herein, the front panel first end and the first side panel first end define a first arcuate corner of the outlet header.

In addition to one or more of the features described herein, the front panel second end and the second side panel first end define a second arcuate corner of the outlet header.

In addition to one or more of the features described herein, a first side panel extension extends from an end of the first side panel arcuate portion towards the first side panel second end.

In addition to one or more of the features described herein, a rear panel disposed opposite the front panel and extending between the first side panel second end and the second side panel second end.

In addition to one or more of the features described herein, the front panel, the rear panel, the first side panel, and the second side panel define a first outlet.

In addition to one or more of the features described herein, a second outlet separated from the first outlet by the rear panel.

In addition to one or more of the features described herein, a secondary heat exchanger operatively connected to the primary heat exchanger and the inlet header, the secondary heat exchanger arranged to receive the second fluid along the second axis and is arranged such that first fluid flows through the secondary heat exchanger in a direction that is disposed substantially parallel to the second axis.

Also disclosed is a heat exchanger assembly. The heat exchanger assembly includes an outlet header having a first outlet and a second outlet spaced apart from the first outlet. The outlet header includes a first side panel, a second side panel, and a front panel. The first side panel has a first side panel first portion, a first side panel second portion, and a first side panel arcuate portion extending between the first side panel first portion and the first side panel second portion along a first axis. Each first side panel portion extends from a first side panel first end towards a first side panel second end along a second axis. The second side panel has a second side panel first portion, a second side panel second portion, and a second side panel arcuate portion extending between the second side panel first portion and the second side panel second portion along the first axis. Each second side panel portion extends from a second side panel first end towards a second side panel second end along the second axis. The front panel extends between the first side panel first end and the second side panel first end.

In addition to one or more of the features described herein, the front panel includes a front panel first end that abuts the first side panel first end and a front panel second end that abuts the second side panel first end.

In addition to one or more of the features described herein, the front panel first end includes a first end first portion that is disposed parallel to the first side panel first portion, a first end second portion that is disposed parallel to the first side panel second portion, and a first end arcuate portion extends between the first end first portion and the first end second portion, the first end arcuate portion abuts the first side panel arcuate portion to define a first arcuate corner.

In addition to one or more of the features described herein, the front panel second end includes a second end first portion that is disposed parallel to the second side panel first portion, a second end second portion that is disposed parallel to the second side panel second portion, and a second end arcuate portion extends between the second end first portion and the second end second portion, the second end arcuate portion abuts the second side panel arcuate portion to define a second arcuate corner.

In addition to one or more of the features described herein, a rear panel extending between the first side panel second end and the second side panel second end and separating the first outlet from the second outlet.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
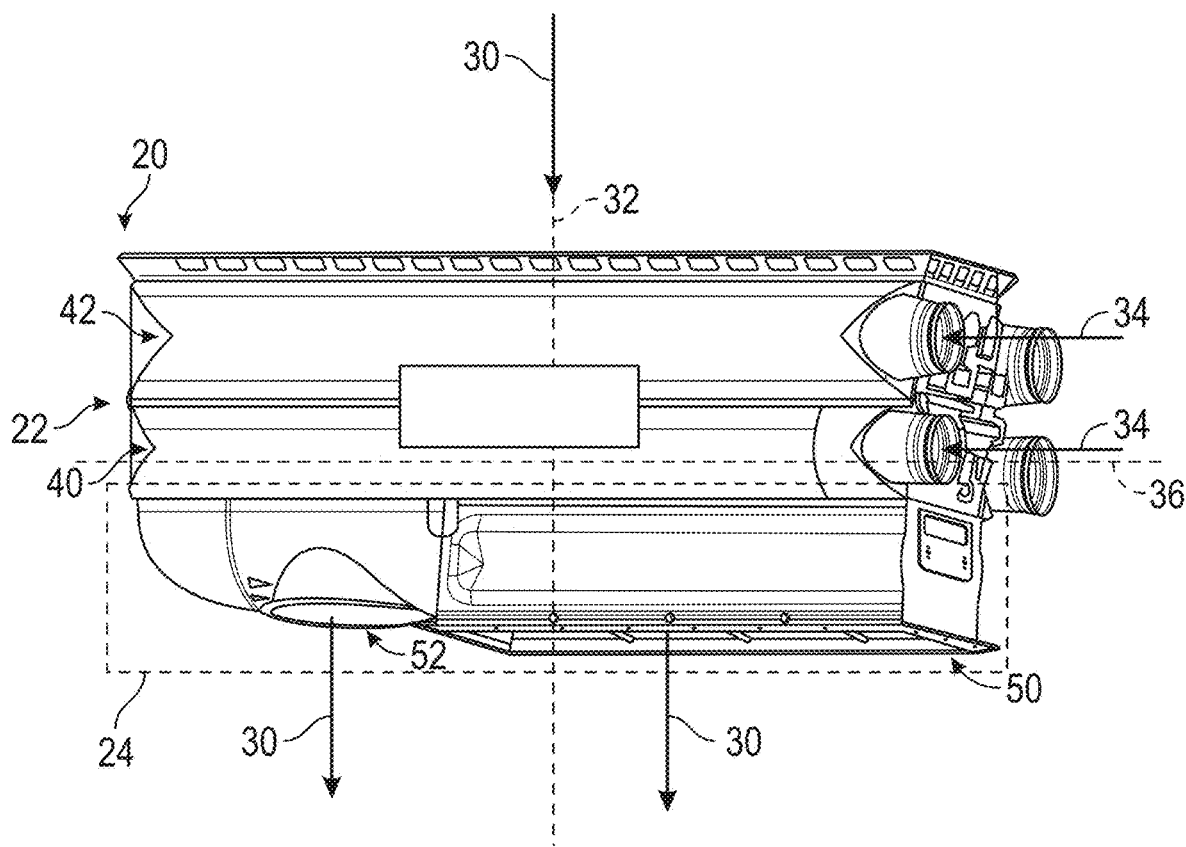
FIG. 1 is a perspective view of a heat exchanger assembly.

An aircraft may have a cabin that is provided with environmental control system. The environmental control system is arranged to provide conditioned air to the cabin. The environmental control system is arranged to receive external air such as a ram air or air bled from a gas turbine engine of the aircraft that is used by a heat exchanger assembly 10, as shown in FIG. 1, to condition a fluid, such as air, that is provided to the cabin or other components of the aircraft. Herein, the term "condition" is intended to mean that a fluid that passes through the heat exchanger assembly may have its temperature, pressure, or density either increased, decreased, or maintained.

Referring to FIG. 1, the heat exchanger assembly 10 includes an inlet header 20, a dual heat exchanger 22, and an outlet header 24.

The inlet header 20 is arranged to receive a first fluid 30 that flows along a first axis 32. The inlet header 20 may be operatively connected to a ram air inlet duct such that the first fluid 30 is ram air. The inlet header 20 is arranged to direct the first fluid 30 towards the dual heat exchanger 22, such that the first fluid 30 cools a fluid that flows within or through the dual heat exchanger 22.

The dual heat exchanger 22 is operatively connected to and is disposed between the inlet header 20 and the outlet header 24. The first fluid 30 flows through the dual heat exchanger 22 along the first axis 32. The flow of the first fluid 30 through the dual heat exchanger 22 cools a second fluid 34 that flows through the dual heat exchanger 22 along, or substantially parallel to, a second axis 36 that is disposed substantially transverse to the first axis 32.

The dual heat exchanger 22 includes a primary heat exchanger 40 and a secondary heat exchanger 42 that is operatively connected to the primary heat exchanger 40. The primary heat exchanger 40 is operatively connected to the outlet header 24. The primary heat exchanger 40 is arranged to receive and cool the second fluid 34 that flows along the second axis 36. The second fluid 34 flows through the primary heat exchanger 40 towards an air cycle machine and is then provided to the secondary heat exchanger 42.

The secondary heat exchanger 42 is operatively connected primary heat exchanger 40 and the inlet header 20. The secondary heat exchanger 42 is arranged to receive and cool the second fluid 34 that flows in a direction that is disposed substantially parallel to the second axis 36. In such an arrangement, the first fluid 30 passes through the secondary heat exchanger 42 and the primary heat exchanger 40 along the first axis 32 and cools the second fluid 34 that flows through the primary heat exchanger 40 and the secondary heat exchanger 42 along the second axis 36. The first fluid 30 is exhausted from the heat exchanger assembly 10 through the outlet header 24 along the first axis 32.

Figure 2:
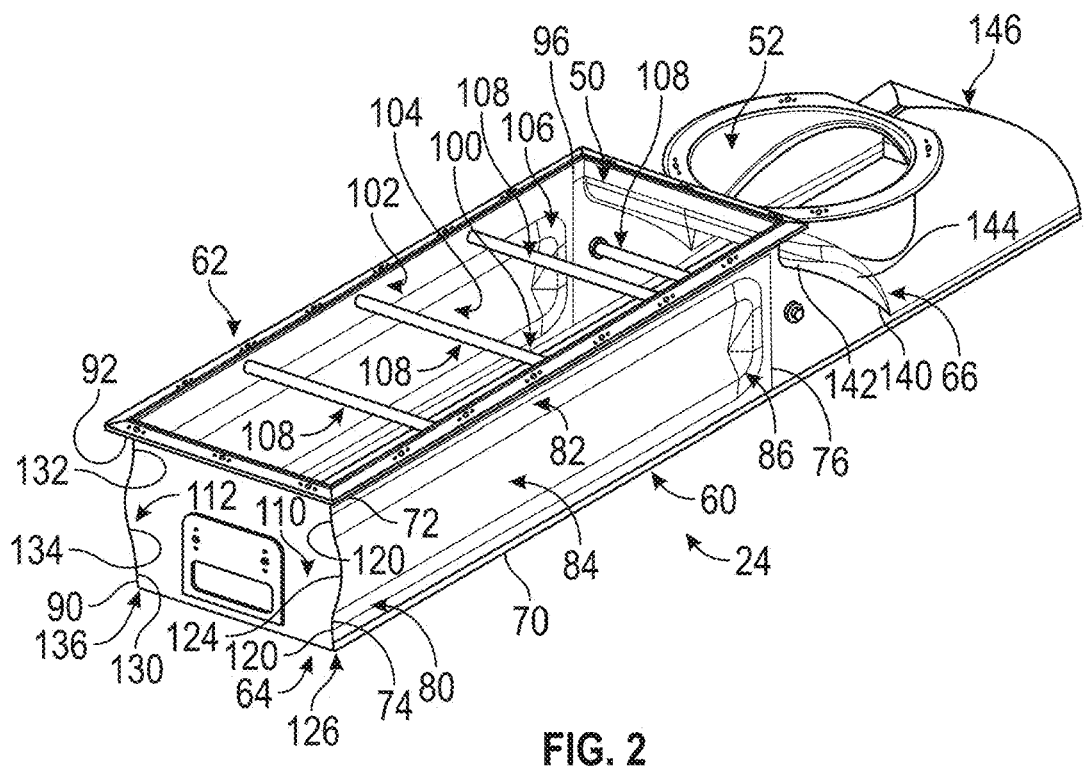
FIG. 2 is a first perspective view of an inlet header of the heat exchanger assembly.
Figure 3:
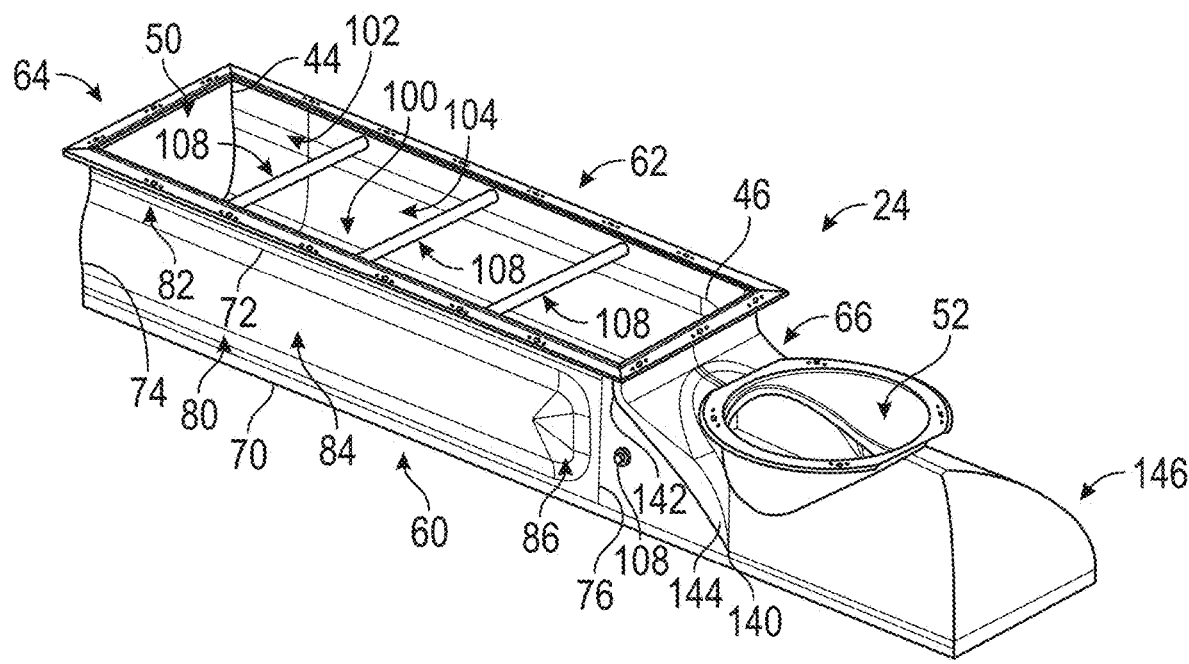
FIG. 3 is a second perspective view of the inlet header of the heat exchanger assembly.

Referring to FIGS. 1-3, the outlet header 24 is operatively connected to at least one of the primary heat exchanger 40 and the secondary heat exchanger 42 of the dual heat exchanger 22. The outlet header 24 is arranged as a dual outlet header having a first outlet 50 and a second outlet 52 that is spaced apart from the first outlet 50. The heat exchanger assembly 10 is arranged to selectively enable the first fluid 30 to be exhausted through the first outlet 50, the second outlet 52 or both of the first outlet 50 and the second outlet 52 along the first axis 32. The outlet header 24 includes a first side panel 60, a second side panel 62, a front panel 64, and a rear panel 66.

The first side panel 60 extends between a first side panel proximal end 70 that is operatively connected to the primary heat exchanger 40 towards a first side panel distal end 72 that at least partially defines the first outlet 50 along the first axis 32. The first side panel 60 extends between a first side panel first end 74 that is operatively connected to the front panel 64 towards a first side panel second end 76 that is disposed proximate the rear panel 66. The first side panel 60 may have a height measured between the first side panel proximal end 70 and the first side panel distal end 72 between 8.69 inches (22.07 cm) and 8.82 inches (22.40 cm). The first side panel 60 may have a length measured between the first side panel first end 74 and the first side panel second end 76 of about 29.17 inches (74.09 cm).

The first side panel 60 includes a first side panel first portion 80, a first side panel second portion 82, and a first side panel arcuate portion 84 that extends between the first side panel first portion 80 and the first side panel second portion 82. The first side panel first portion 80 extends from the first side panel proximal end 70 towards an end of the first side panel arcuate portion 84 along the first axis 32. The first side panel first portion 80 is disposed generally parallel to the first axis 32. The first side panel first portion 80 also extends from the first side panel first end 74 towards the first side panel second end 76 along the second axis 36.

The first side panel second portion 82 extends from another end of the first side panel arcuate portion 84 towards the first side panel distal end 72 along the first axis 32. The first side panel second portion 82 is disposed generally parallel to the first axis 32.

The first side panel arcuate portion 84 extends between the first side panel first portion 80 and the first side panel second portion 82 along the first axis 32. The first side panel arcuate portion 84 is disposed in a nonparallel relationship with the first axis 32. The first side panel arcuate portion 84 causes the first side panel 60 to be curved or have a general c-shape. The first side panel arcuate portion 84 may have a radius of curvature such that at least a portion of the first side panel arcuate portion 84 bows or extends away from the first axis 32 and the first side panel first portion 80 and the first side panel second portion 82. The first side panel arcuate portion 84 may have a radius of curvature measured from a center or centroid of the inlet header 20 is between 6.36 inches (16.15 cm) and 6.75 inches (17.14 cm). A maximum distance measured between a peak or apex of the first side panel arcuate portion 84 and the first side panel first portion 80 and the first side panel second portion 82 is between 0.55 inches (1.39 cm) and 0.61 inches (1.55 cm). A maximum distance measured between a peak or apex of the first side panel arcuate portion 84 and the center or centroid of the inlet header 20 is about 6.13 inches (15.57 cm).

The first side panel 60 includes a first side panel extension 86 that extends from an end of the first side panel arcuate portion 84 towards the first side panel second end 76. The first side panel extension 86 acts as a transition to taper the first side panel arcuate portion 84 towards a substantially parallel relationship with the first axis 32, the first side panel first portion 80, and the first side panel second portion 82.

The second side panel 62 is disposed opposite the first side panel 60. The second side panel 62 extends between a second side panel proximal end 90 that is operatively connected to the primary heat exchanger 40 towards a second side panel distal end 92 that at least partially defines the first outlet 50 along the first axis 32. The second side panel 62 extends between a second side panel first end 94 that is operatively connected to the front panel 64 towards a second side panel second end 96 that is disposed proximate the rear panel 66. The second side panel 62 may have a height measured between the second side panel proximal end 90 and the second side panel distal end 92 between 8.69 inches (22.07 cm) and 8.82 inches (22.40 cm). The second side panel 62 may have a length measured between the second side panel first end 94 and the second side panel second end 96 of about 29.17 inches (74.09 cm).

The second side panel 62 includes a second side panel first portion 100, a second side panel second portion 102, and a second side panel arcuate portion 104 that extends between the second side panel first portion 100 and the second side panel second portion 102. The second side panel first portion 100 extends from the second side panel proximal end 90 towards an end of the second side panel arcuate portion 104 along the first axis 32. The second side panel first portion 100 is disposed generally parallel to the first axis 32. The second side panel first portion 100 also extends from the second side panel first end 94 towards the second side panel second end 96 along the second axis 36. A distance measured between the first side panel first portion 80 or the first side panel second portion 82 and the second side panel first portion 100 or the second side panel second portion 102 is about 12.60 inches (32.00 cm).

The second side panel second portion 102 extends from another end of the second side panel arcuate portion 104 towards the second side panel distal end 92 along the first axis 32. The second side panel second portion 102 is disposed generally parallel to the first axis 32.

The second side panel arcuate portion 104 extends between the second side panel first portion 100 and the second side panel second portion 102 along the first axis 32. The second side panel arcuate portion 104 is disposed in a nonparallel relationship with the first axis 32. The second side panel arcuate portion 104 causes the second side panel 62 to be curved or have a general c-shape. The second side panel arcuate portion 104 may have a radius of curvature such that at least a portion of the second side panel arcuate portion 104 bows or extends away from the first axis 32 and the second side panel first portion 100 and the second side panel second portion 102. The second side panel arcuate portion 104 may have a radius of curvature measured from a center or centroid of the inlet header 20 is between 6.36 inches (16.15 cm) and 6.75 inches (17.14 cm). A maximum distance measured between a peak or apex of the second side panel arcuate portion 104 and the second side panel first portion 100 and the second side panel second portion 102 is between 0.55 inches (1.39 cm) and 0.61 inches (1.55 cm). A maximum distance measured between a peak or apex of the second side panel arcuate portion 104 and the center or centroid of the inlet header 20 is about 6.13 inches (15.57 cm).

The second side panel 62 includes a second side panel extension 106 that extends from an end of the second side panel arcuate portion 104 towards the second side panel second end 96. The second side panel extension 106 acts as a transition to taper the second side panel arcuate portion 104 towards a substantially parallel relationship with the first axis 32, the second side panel first portion 100, and the second side panel second portion 102.

A plurality of tie rods 108 extend between the first side panel 60 and the second side panel 62. The plurality of tie rods 108 may extend between the first side panel second portion 82 and the second side panel second portion 102. At least one tie rod of the plurality of tie rods 108 is disposed proximate and extends between the first side panel second end 76 and the second side panel second end 96 and is located proximate the rear panel 66.

Figure 4:
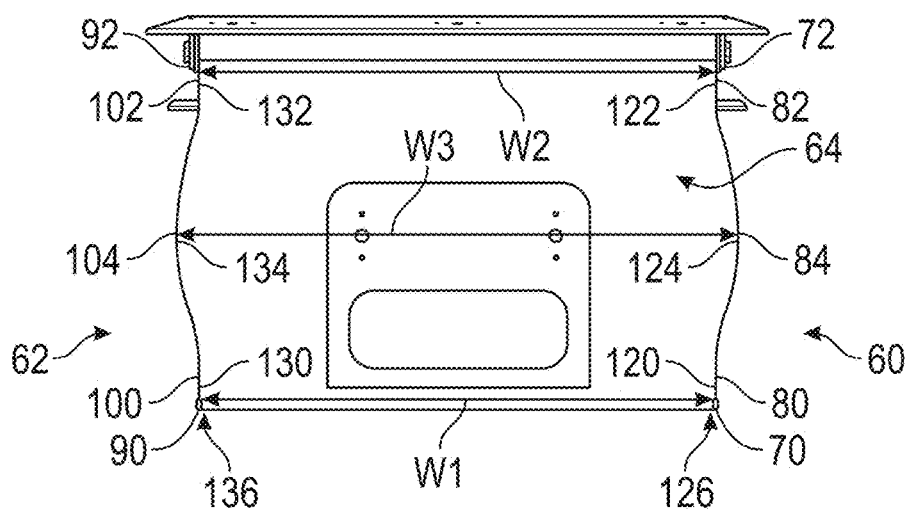
FIG. 4 is an end view of the inlet header of the heat exchanger assembly.

Referring to FIG. 4, a first width, w1, is measured between the first side panel first portion 80 and the second side panel first portion 100. A second width, w2, is measured between the first side panel second portion 82 and the second side panel second portion 102. The first width, w1, is substantially equal to the second width, w2. A third width, w3, is measured between the first side panel arcuate portion 84 and the second side panel arcuate portion 104. The third width, w3, is greater than at least one of the first width, w1, and the second width, w2.

Referring to FIGS. 2-4, the front panel 64 and is operatively connected to the first side panel 60 and the second side panel 62. The front panel 64 extends between a front panel first end 110 and a front panel second end 112. The front panel 64 is disposed generally parallel to the first axis 32 and is disposed generally perpendicular to the second axis 36.

The front panel first end 110 is disposed proximate the first side panel first end 74 and extends between the first side panel proximal end 70 and the first side panel distal end 72. The front panel first end 110 is connected to or abuts the first side panel first end 74. The front panel first end 110 has a contour that matches the contour of the first side panel 60, in at least one embodiment.

The front panel first end 110 includes a first end first portion 120, a first end second portion 122, and a first end arcuate portion 124 that extends between the first end first portion 120 and the first end second portion 122. The first end first portion 120 is disposed parallel to and is operatively connected to the first side panel first portion 80. The first end second portion 122 is disposed parallel to and is operatively connected to the first side panel second portion 82. The first end arcuate portion 124 extends between the first end first portion 120 and the first end second portion 122. The first end arcuate portion 124 abuts the first side panel arcuate portion 84 to define a first arcuate corner 126 of the outlet header 24.

The front panel second end 112 is disposed proximate the second side panel first end 94 and extends between the second side panel proximal end 90 and the second side panel distal end 92. The front panel second end 112 is connected to or abuts the second side panel first end 94. The front panel second end 112 has a contour that matches the contour of the second side panel 62, in at least one embodiment.

The front panel second end 112 includes a second end first portion 130, a second end second portion 132, and a second end arcuate portion 134 that extends between the second end first portion 130 and the second end second portion 132. The second end first portion 130 is disposed parallel to and is operatively connected to the second side panel first portion 100. The second end second portion 132 is disposed parallel to and is operatively connected to the second side panel second portion 102. The second end arcuate portion 134 extends between the second end first portion 130 and the second end second portion 132. The second end arcuate portion 134 abuts the second side panel arcuate portion 104 to define a second arcuate corner 136 of the outlet header 24.

The first side panel arcuate portion 84 of the first side panel 60, the first arcuate corner 126, the second side panel arcuate portion 104 of the second side panel 62, and the second arcuate corner 136 provide thermal stress reductions for the outlet header 24. The thermal stress reductions reduce field issues of the heat exchanger assembly 10 by inhibiting or reducing the potential of stress crack formation to improve part life of the outlet header 24 of the heat exchanger assembly 10.

The rear panel 66 is disposed opposite the front panel 64. The rear panel 66 is disposed substantially nonparallel and non-perpendicular to the front panel 64. The rear panel 66 extends between the first side panel second end 76 and the second side panel second end 96. Distal ends of the first side panel 60, the second side panel 62, the front panel 64, and the rear panel 66 define the first outlet 50.

The rear panel 66 includes a rear panel proximal end 140 and a rear panel distal end 142. The rear panel proximal end 140 is disposed proximate and extends between the first side panel proximal end 70 and the second side panel proximal end 90. The rear panel distal end 142 is disposed proximate and extends between the first side panel distal end 72 and the second side panel distal end 92. The rear panel 66 is angled relative to the front panel 64 such that the rear panel distal end 142 is disposed closer to the front panel 64 than the rear panel proximal end 140.

The rear panel 66 includes a rear panel arcuate portion 144 that extends between the rear panel proximal end 140 and the rear panel distal end 142. The rear panel arcuate portion 144 is configured as a bulge, a bowed portion, or a curved portion that curves towards a portion 146 of the outlet header 24 that defines the second outlet. Furthermore, the rear panel 66 separates the first outlet 50 from the second outlet 52.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heat exchanger assembly for an environmental control system, comprising:
    an inlet header arranged to receive a first fluid that flows along a first axis;
    a primary heat exchanger arranged to receive a second fluid that flows along a second axis that is disposed transverse to the first axis, the primary heat exchanger arranged such that the first fluid flows through the primary heat exchanger along the first axis; and
    an outlet header operatively connected to the primary heat exchanger and arranged to exhaust the first fluid, the outlet header comprising:
    a first side panel having a first side panel first portion, a first side panel second portion, and a first side panel arcuate portion extending between the first side panel first portion and the first side panel second portion along the first axis, and
    a second side panel spaced apart from the first side panel, the second side panel having a second side panel first portion, a second side panel second portion, and a second side panel arcuate portion extending between the second side panel first portion and the second side panel second portion; wherein:
    the first side panel first portion, the first side panel second portion, and the first side panel arcuate portion extends from a first side panel first end towards a first side panel second end along the second axis;
    the second side panel first portion, the second side panel second portion, and the second side panel arcuate portion extends from a second side panel first end towards a second side panel second end along the second axis;
    the assembly further comprises a front panel extending between a front panel first end and a front panel second end, wherein the front panel first end is connected to the first side panel first end and the front panel second end is connected to the second side panel first end;
    the front panel first end and the first side panel first end define a first arcuate corner of the outlet header; and
    the front panel second end and the second side panel first end define a second arcuate corner of the outlet header.

2. The heat exchanger assembly of claim 1, wherein a first width is measured between the first side panel first portion and the second side panel first portion, a second width is measured between the first side panel second portion and the second side panel second portion, and a third width is measured between the first side panel arcuate portion and the second side panel arcuate portion.

3. The heat exchanger assembly of claim 2, wherein the third width is greater than at least one of the first width and the second width.

4. The heat exchanger assembly of claim 1, wherein the first side panel first portion and the first side panel second portion are disposed parallel to the first axis and the first side panel arcuate portion is disposed in a nonparallel relationship with the first axis.

5. The heat exchanger assembly of claim 1, wherein the second side panel first portion and the first side panel second portion are disposed parallel to the first axis and the second side panel arcuate portion is disposed in a nonparallel relationship with the first axis.

6. The heat exchanger assembly of claim 1, further comprising:
a rear panel disposed opposite the front panel and extending between the first side panel second end and the second side panel second end.

7. The heat exchanger assembly of claim 6, wherein the front panel, the rear panel, the first side panel, and the second side panel define a first outlet.

8. The heat exchanger assembly of claim 7, wherein the outlet header further comprising:
a second outlet separated from the first outlet by the rear panel.

9. The heat exchanger assembly of claim 7, further comprising:
a secondary heat exchanger operatively connected to the primary heat exchanger and the inlet header, the secondary heat exchanger arranged to receive the second fluid such that second fluid flows through the secondary heat exchanger in a direction that is disposed substantially parallel to the second axis.

10. A heat exchanger assembly, comprising:
an outlet header having a first outlet and a second outlet spaced apart from the first outlet, the first outlet comprising:
a first side panel having a first side panel first portion, a first side panel second portion, and a first side panel arcuate portion extending between the first side panel first portion and the first side panel second portion along a first axis, each first side panel portion extending from a first side panel first end towards a first side panel second end along a second axis,
a second side panel having a second side panel first portion, a second side panel second portion, and a second side panel arcuate portion extending between the second side panel first portion and the second side panel second portion along the first axis, each second side panel portion extending from a second side panel first end towards a second side panel second end along the second axis, and
a front panel extending between the first side panel first end and the second side panel first end; wherein:
the front panel includes a front panel first end that abuts the first side panel first end and a front panel second end that abuts the second side panel first end the front panel first end includes a first end first portion that is disposed parallel to the first side panel first portion, a first end second portion that is disposed parallel to the first side panel second portion, and a first end arcuate portion extends between the first end first portion and the first end second portion, the first end arcuate portion abuts the first side panel arcuate portion to define a first arcuate corner.

11. The heat exchanger assembly of claim 10, wherein the front panel second end includes a second end first portion that is disposed parallel to the second side panel first portion, a second end second portion that is disposed parallel to the second side panel second portion, and a second end arcuate portion extends between the second end first portion and the second end second portion, the second end arcuate portion abuts the second side panel arcuate portion to define a second arcuate corner.

12. The heat exchanger assembly of claim 11, further comprising:
a rear panel extending between the first side panel second end and the second side panel second end and separating the first outlet from the second outlet.

* * * * *